(12) United States Patent
Liu et al.

(10) Patent No.: US 10,456,705 B2
(45) Date of Patent: Oct. 29, 2019

(54) FLUE GAS CONDENSATION WATER EXTRACTION SYSTEM

(71) Applicant: Chunxiao Liu, Xilingol League, Inner Mogolia (CN)

(72) Inventors: Chunxiao Liu, Inner Mogolia (CN); Peidong Yu, Inner Mogolia (CN); Kaige Shi, Inner Mogolia (CN); Chaoyou Hu, Inner Mogolia (CN); Lijie Xiu, Inner Mogolia (CN); Yong Chen, Inner Mogolia (CN); Jianbing Ding, Inner Mogolia (CN); Shuangyan Jia, Inner Mogolia (CN); Xingjia Huo, Inner Mogolia (CN); Youlin Cai, Inner Mogolia (CN)

(73) Assignee: Chunxiao Liu, Xilingol Leage, Inner Mongolia (CN)

( * ) Notice: Subject to any disclaimer, the term of this patent is extended or adjusted under 35 U.S.C. 154(b) by 37 days.

(21) Appl. No.: 16/304,298

(22) PCT Filed: Jul. 13, 2017

(86) PCT No.: PCT/CN2017/092701
§ 371 (c)(1),
(2) Date: Nov. 25, 2018

(87) PCT Pub. No.: WO2018/014769
PCT Pub. Date: Jan. 25, 2018

(65) Prior Publication Data
US 2019/0083900 A1 Mar. 21, 2019

(30) Foreign Application Priority Data

Jul. 22, 2016 (CN) .......................... 2016 1 0583258

(51) Int. Cl.
*B01D 5/00* (2006.01)
*B01D 53/00* (2006.01)
(Continued)

(52) U.S. Cl.
CPC ........... *B01D 5/0003* (2013.01); *B01D 5/003* (2013.01); *B01D 5/0051* (2013.01);
(Continued)

(58) Field of Classification Search
None
See application file for complete search history.

(56) References Cited

FOREIGN PATENT DOCUMENTS

CN 102168888 A * 8/2011

OTHER PUBLICATIONS

Wang et al. CN102168888A—translated document (Year: 2011).*

* cited by examiner

*Primary Examiner* — Jelitza M Perez
(74) *Attorney, Agent, or Firm* — Liang Legal Group, PLLC

(57) ABSTRACT

A flue gas condensation water extraction system includes a flue gas condensation-end system and a flue gas refrigeration source-end system. The flue gas condensation-end system includes a desulfurization absorption tower, a flue gas purification and condensation tower, and a condensed water storage tank. The flue gas purification and condensation tower is arranged above the desulfurization absorption tower. A flue gas outlet, a water inlet, and a water outlet are provided on the flue gas purification and condensation tower. The flue gas refrigeration source-end system includes a cooling tower. The water outlet is connected to the condensed water storage tank via a condensed water downcomer. The water inlet is connected to the cooling tower via a circulating water supply pipe. A condensation circulation (Continued)

water pump is provided on the circulating water supply pipe. The cooling tower is connected to the condensed water storage tank via a circulating water return pipe.

7 Claims, 2 Drawing Sheets

(51) Int. Cl.
    *B01D 53/18*         (2006.01)
    *B01D 53/14*         (2006.01)

(52) U.S. Cl.
    CPC ......... *B01D 5/0075* (2013.01); *B01D 5/0087* (2013.01); *B01D 53/005* (2013.01); *B01D 53/18* (2013.01); *B01D 53/1418* (2013.01)

FLUE GAS CONDENSATION WATER EXTRACTION SYSTEM

BACKGROUND OF THE INVENTION

Technical Field

The invention relates to a flue gas condensation water extraction system, belonging to the technical field of flue gas water extraction.

Background Art

In the field of atmospheric pollutants control and flue gas desulfurization, the wet desulfurization process is a mature and reliable technology, with a high desulfurization efficiency and strong adaptability. It is the most widely used flue gas desulfurization technology. However, the wet desulfurization process consumes a large amount of water, which has become an increasingly prominent issue. Thermal power generation industry, chemical industry, and metal smelting industry generally use limestone-gypsum wet desulfurization technology for flue gas purification treatments. Due to the characteristics of the processes, the high-temperature flue gas carries a large amount of saturated water vapor and droplets during desulfurization treatments. The process consumes a lot of water replenishment, resulting in a lot of water consumption. In water-deficient areas, the conflict between water consumption and water scarcity is particularly prominent. Under the current conditions, where the water resources are increasingly scarce, a new water-extraction system is urgently needed to meet the water consumption for power generation and meet the huge demand for water use in industrial production.

SUMMARY OF THE PRESENT INVENTION

The invention aims at overcoming the deficiencies of the prior art and provides a flue gas water condensation water extraction system, which can condense and recover a large amount of water in the flue gas, thereby solving the problem of huge water consumption in the wet desulfurization system.

A technical solution to solve the above technical problems is as follows: a flue gas condensation extraction system comprises a flue gas condensation end system, a flue gas refrigeration source end system, and a water supply and drainage system. The flue gas condensation end system comprises a desulfurization absorption tower, a flue gas purification condensation tower, and a condensate storage tank. The desulfurization absorption tower is provided with a flue gas inlet. The flue gas purification condensation tower is disposed above the desulfurization absorption tower. The flue gas purification condensation tower is provided with a flue gas outlet, a water inlet, and a drain. The flue gas refrigeration source end system comprises a cooling tower. The drain is connected to the condensate storage tank via a descending condensate water pipe. The water inlet is connected to the cooling tower via a circulating water supply pipe. The circulating water supply pipe is provided with a condensate circulating water pump. The cooling tower is connected to the condensate storage tank via a circulating water return pipe. Valves are provided on the circulating water return pipe and the circulating water supply pipe. The water supply and drainage system includes an underground water storage tank. The underground water storage tank is connected to the condensate storage tank via a water filling pipe. The water filling pipe is provided with a water pump. The underground water storage tank is connected to the circulating water return pipe and circulating water supply pipe via the drain/discharge pipe. The drain (or discharge) pipe is provided with a drain valve.

The beneficial effects of the present invention include: on the basis of purifying the flue gas in the desulfurization absorption tower, the flue gas can be further purified by the flue gas purification condensation tower. The concentration of soot and the concentration of sulfur dioxide are further reduced. The phenomenon of gypsum entraining with desulfurization flue gas is completely eliminated. The water filling and draining system is used to automatically complete water filling during the initial startup of the system and water drainage during the initial shutdown of the system, so that the water extraction process of the flue gas condensing and extraction system has high reliability, completeness, and adaptability, and can automatically finish startup and shutdown of the system, and it can run with a long-term stability. The system can accomplish condensing and extraction of water from the flue gas after wet desulfurization treatment, providing a large amount of water for use in the production and significantly saving water resources. In addition, the initial capital investment of the system is low, and the cost for water recovery is moderate. The flue gas condensate extraction system has a smaller resistance on circulating water side and a moderate resistance on flue gas side, leading to a high efficiency in heat exchange between the flue gas and the condensate water.

Based on the above technical solutions, the present invention can also be improved as follows.

Further, a condensate storage tank overflow pipe is disposed between the condensate storage tank and the underground water storage tank.

The beneficial effects in adopting the above further embodiment include that the condensate water is introduced into the condensate storage tank, and when the water in the condensate storage tank reaches the overflow level, water will flow along the overflow pipeline into the underground water storage tank. The underground water storage tank achieves water volume adjustment functions and can be used, via a water pump, as water supply for the desulfurization process. The surplus water volume can also be used as water supply in the production processes. The underground water storage tank also helps keep the water level in the condensate storage tank no higher than the overflow level.

Further, the flue gas condensation end system further includes a reagent addition device (i.e., a dosing device). The reagent addition device (dosing device) includes a reagent addition tank and a stirrer. The reagent addition tank is connected to the condensate water storage tank via a reagent addition pipe. The reagent addition pipe includes a dosing (reagent addition) pump. A reagent addition tank is for addition of a regent, and the medicament is $Na_2CO_3$ or NaOH.

The above further embodiment has the beneficial effects that the reagent addition device can be used to adjust the properties of the condensate water. The reagent is placed in the reagent addition tank, and the reagent can be $Na_2CO_3$ or NaOH. After mixing with the stirrer, a solution of $Na_2CO_3$ or NaOH is prepared, which may be fed into the condensate storage tank using the dosing pump such that the pH of the condensate water is not less than 7. The treated water can be directly used as water supply for the desulfurization system or in factory production processes.

Further, the liquid level of the condensate storage tank is higher than the liquid filling level of the cooling tower.

The beneficial effects of adopting the above further embodiment include: the liquid filling level is the height of the liquid column after the liquid filled the cooling tower.

The liquid level of the condensate storage tank is higher than the liquid filling level of the cooling tower. Thus, water can flow from the condensing storage tank into the cooling tower. When the water pump fills the condensate storage tank, the water can automatically flow into the cooling tower at the same time. The water pressure inside the cooling tower would be stable, and there is no for an expansion water tank.

Further, the flue gas outlet is connected to the chimney via a smoke flue.

Beneficial effects of the above-described further solution include that the flue gas is dispersed in the sky, diluted and transported with winds over a long distance.

The height and the angle of rotation of the output portion 3 of the plasma processing apparatus may be adjusted manually or automatically by a control unit.

Further, the desulfurization absorption tower is provided with a flue gas desulfurization outlet. The flue gas desulfurization outlet is provided with a bypass flue. The bypass flue is provided with a flue flapper door. The outlet of bypass flue is connected to the smoke flue.

The beneficial effects of adopting the above further solution is that when the flue flapper door is fully open, the clean flue gas that has passed through the desulfurization absorption tower can enter the bypass flue, thereby bypassing the flue gas purification condensation tower to discharge into the chimney. When the flue gas purification condensation tower fails, the desulfurization absorption tower can still operate normally, and the flue gas can still complete the desulfurization purification.

In the figures: 1, desulfurization absorption tower; 2, flue gas purification condensation tower; 3, condensate storage tank; 4, condensate circulation pump; 5, cooling tower; 6, underground water storage tank; 7, water supply pump; 8, reagent addition tank; 9, stirrer; 10, reagent addition pump; 11, chimney; 12. Flue gas inlet; 13, flue gas desulfurization outlet; 14, bypass flue; 15, flue baffle door; 16, discharge valve; 17, valve; G1, condensate descending pipe; G2, circulating water return pipe; G3, circulating water supply pipe; G4, condensate water storage tank overflow pipe; G5, supply water pipe; drain pipe; G7, reagent addition pipe.

DETAILED DESCRIPTION

The principles and features of the present invention will be described in conjunction with the following examples, which are intended to illustrate the invention and are not intended to limit the scope of the invention.

EXAMPLE 1

Figure 1:
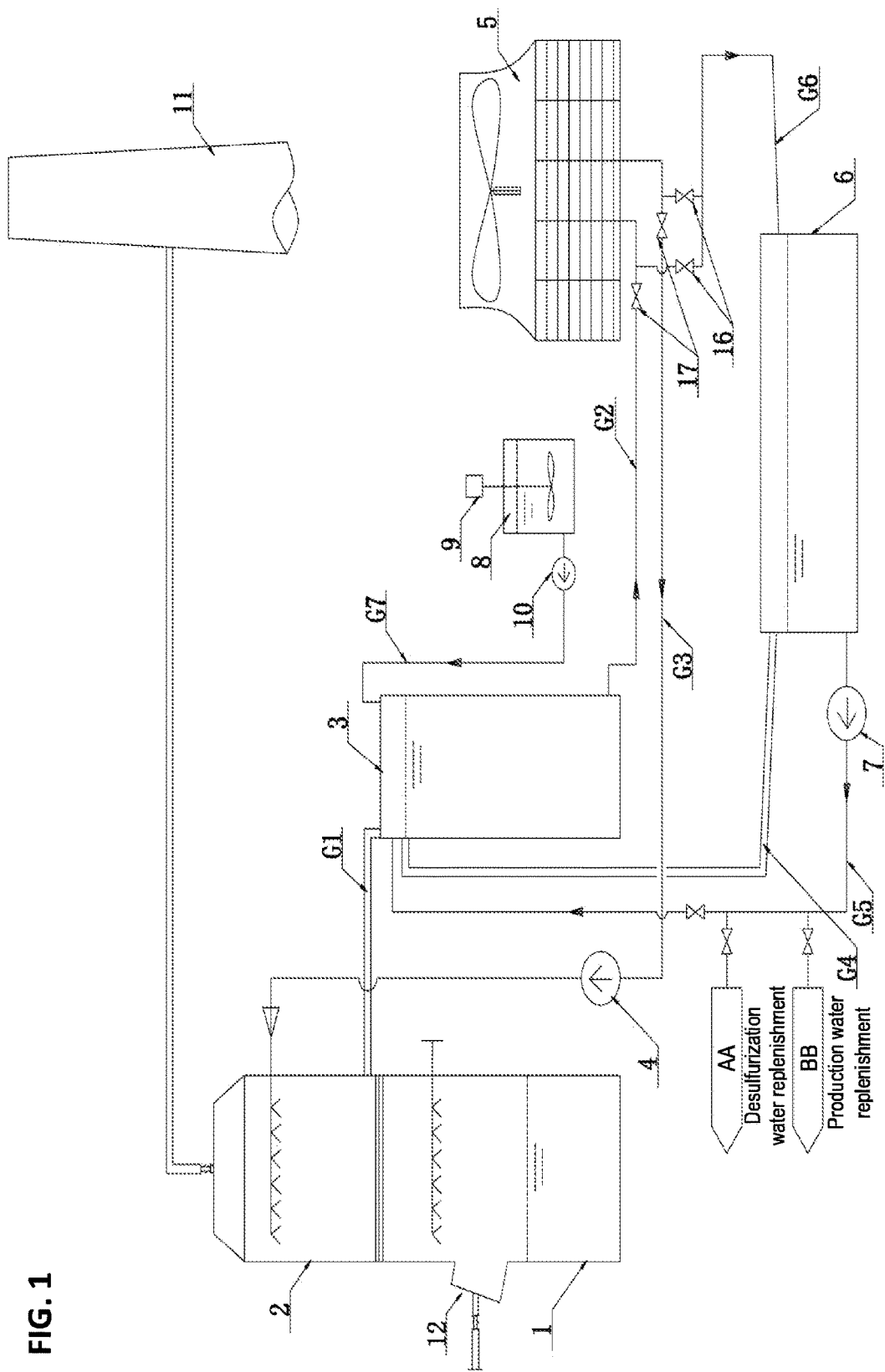
FIG. 1 shows a schematic illustrating a first embodiment of the invention.

As shown in FIG. 1, a flue gas condensation extraction system comprises a flue gas condensation end (or a flue gas condensation terminal) system and a flue gas refrigeration source end (or a flue gas refrigeration source terminal) system. The flue gas condensation end system comprises a desulfurization absorption tower 1, a flue gas purification condensation tower 2, and a condensate storage tank 3. A flue gas inlet 12 is disposed on the desulfurization absorption tower. The flue gas purification condensation tower is disposed above the desulfurization absorption tower. The flue gas purification condensation tower is provided with a flue gas outlet, a water inlet, and a water outlet (drain). The flue gas refrigeration source end system comprises a cooling tower 5. The water outlet is connected to the condensate storage tank 3 via a condensate water descending pipe G1. The water inlet is connected with the cooling tower via a circulating water supply pipe G3. The circulating water supply pipe is provided with a condensate circulating water pump 4. The cooling tower is connected to the condensing water storage tank 3 via a circulating water return pipe G2. The circulating water is return pipe and circulating water supply pipe are respectively provided with valves.

The system further comprises water supply and drainage system, which includes an underground water storage tank 6. The underground water storage tank is connected to the condensate storage tank via a water filling pipe G5. The water filling pipe is provided with a water pump 7. The underground water storage tank is connected to the circulating water return pipe and the circulating water supply pipe via a drainage pipe G6. The drainage pipe is provided with a drain/discharge valve. The water filling and drainage system is used to automatically complete water filling during initial startup and water draining during initial shutdown of the system, such that the water extraction process of the flue gas condensation and water extraction system has a high reliability, completeness, and adaptability. The system can automatically complete the startup and shut-down processes by itself, affording long-term stable operations.

Between the condensate storage tank and the underground water storage tank, there is a condensate storage tank overflow pipe G4. The condensate water will enter the condensate storage tank. When the water in the condensate storage tank reaches the overflow water level, the water will flow along the overflow pipe into the underground water storage tank. The underground water storage tank achieves water volume adjustment/regulation, and a water supply pump can be used to supply water to the desulfurization process. Excess water can also be used to supply water to production processes, keeping the water level in the condensate storage tank no higher than the overflow water level.

The flue gas condensation end system further includes a reagent addition device. The reagent addition device includes a reagent addition tank 8 and an agitator/stirrer 9. The reagent addition tank is connected to the condensate water storage tank via a reagent addition pipe G7. The reagent addition pipe includes a dosing (reagent addition) pump 10. The reagent addition device can be used to adjust the properties of the condensate water. A reagent may be placed in the reagent addition tank. The reagent may be $Na_2CO_3$ or NaOH. After mixing using the stirrer, a solution of $Na_2CO_3$ or NaOH is prepared. The solution can be sent to the condensate water storage tank by the dosing (reagent addition) pump to keep the pH of the condensate water no less than 7. After treatment, the treated water can be used directly as water supply for the desulfurization system or used in factory production.

The liquid level of the condensate storage tank is higher than the liquid filling level in the cooling tower. The filling level is the height of the liquid column after the liquid filled the cooling tower. The filling of the cooling tower is accomplished by the condensate storage tank. When the water pump fills the condensate storage tank, it can also fill the cooling tower at the same time. The water pressure in the cooling tower is stable, and there is no need for an expansion tank.

The flue gas outlet is connected to the chimney 11 via a smoke flue. The flue gas is dispersed into the sky, diluted, and carried by winds over a long distance.

EXAMPLE 2

Figure 2:
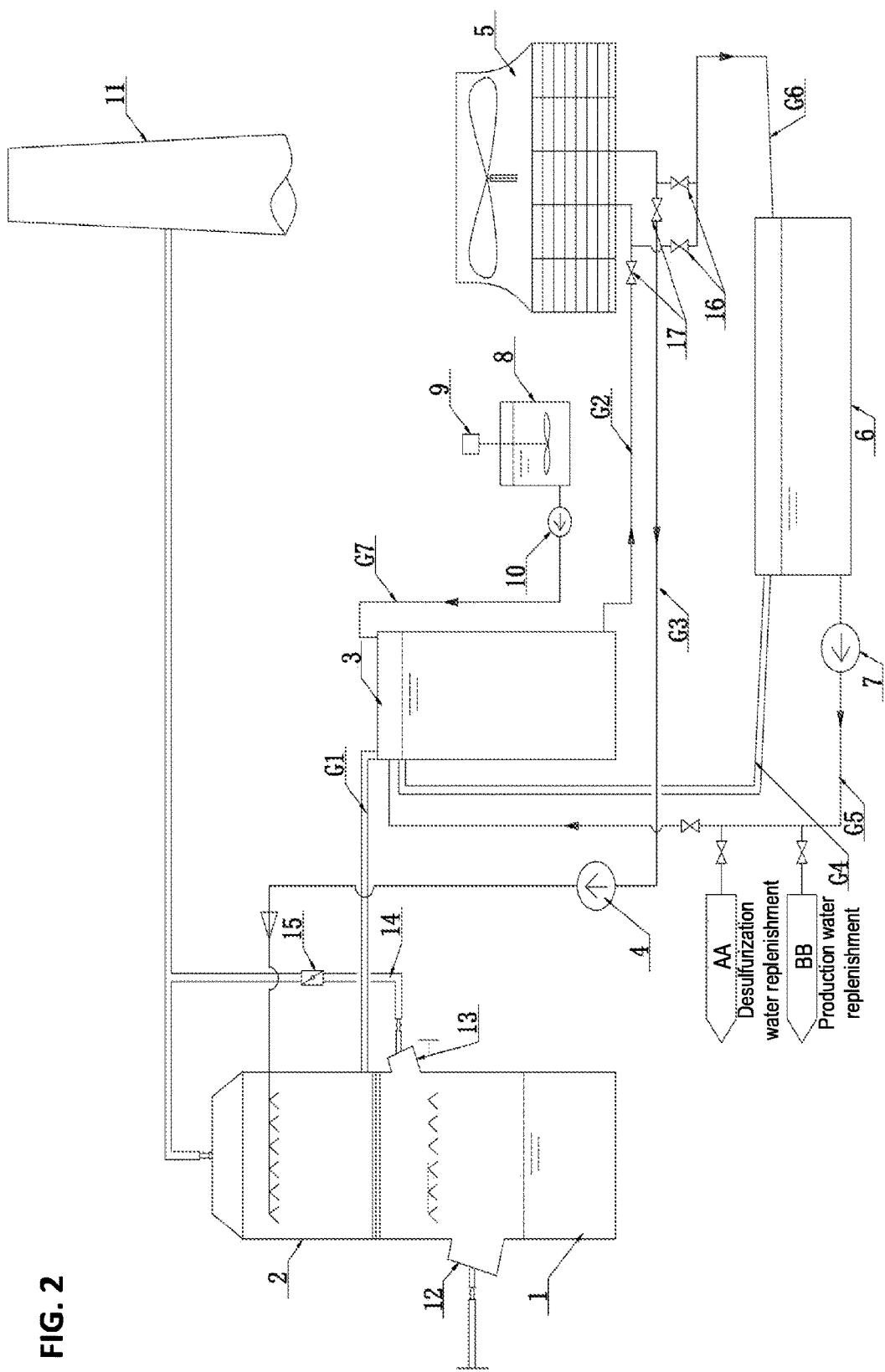
FIG. 2 shows a schematic illustrating a second embodiment of the invention.

As shown in FIG. 2, a flue gas desulfurization outlet 13 is disposed on the desulfurization absorption tower. A bypass flue 14 is disposed at the flue gas desulfurization outlet. A flue baffle door 15 is disposed on the bypass flue. The outlet of the bypass flue is connected to the flue. When the flue baffle door is fully open, the clean flue gas that has passed through the desulfurization absorption tower can enter the bypass flue, thereby bypassing the flue gas purification condensation tower to discharge into the chimney. When the flue gas purification condensation tower fails, the desulfurization absorption tower can still function normally, and the flue gas can still be desulfurized and purified.

The above are preferred embodiments of the present invention and are not intended to limit the present invention. Any modifications, equivalents, improvements, etc., which are within the spirit and scope of the present invention, should be considered within the scope of protection of the present invention.

What is claimed is:

1. A flue gas condensation water extraction system, comprising:
    a flue gas condensation end system;
    a flue gas refrigeration source end system; and
    a water supply and drainage system,
        wherein the flue gas condensation end system comprises a desulfurization absorption tower, a flue gas purification condensation tower, and a condensate storage tank,
        wherein the desulfurization absorption tower is provided with a flue gas inlet,
        wherein the flue gas purification condensation tower is disposed above the desulfurization absorption tower,
        wherein the flue gas purification condensation tower is provided with a flue gas outlet, a water inlet, and a drain,
        wherein the flue gas refrigeration source end system comprises a cooling tower, wherein the drain is connected to the condensate storage tank via a descending condensate water pipe,
        wherein the water inlet is connected to the cooling tower via a circulating water supply pipe,
        wherein a circulating water pump is arranged on the circulating water supply pipe, wherein the cooling tower is connected to the condensate storage tank via a circulating water return pipe,
        wherein the circulating water return pipe and the circulating water supply pipe are respectively provided with valves,
        wherein the water supply and drainage system includes an underground water storage tank, which is connected to the condensate water storage tank via a water filling pipe,
        wherein the water filling pipe is provided with a water pump,
        wherein underground water storage tank is connected to the circulating water return pipe and circulating water supply pipe via a drain pipe, and wherein the drain pipe is provided with a drain valve.

2. The flue gas condensation water extraction system according to claim 1, wherein a condensate storage tank overflow pipe is disposed between the condensate storage tank and the underground water storage tank.

3. The flue gas condensation water extraction system according to claim 1, wherein the flue gas condensation end system further comprises a reagent addition device,
    wherein the reagent addition device comprises a reagent addition tank and a stirrer,
    wherein the reagent addition tank is connected to the condensate storage tank via a reagent addition pipe, and
    wherein the reagent addition pipe is provided with a dosing pump.

4. The flue gas condensation water extraction system according to claim 1,
    wherein a liquid level of the condensate storage tank is higher than a liquid filling level of the cooling tower.

5. The flue gas condensation water extraction system according to claim 1,
    wherein the flue gas outlet is connected to the chimney via a smoke flue.

6. The flue gas condensation water extraction system according to claim 5,
    wherein the desulfurization absorption tower is provided with a flue gas desulfurization outlet, wherein the flue gas desulfurization outlet is provided with a bypass flue, wherein a flue baffle door is disposed on the bypass flue, and wherein an outlet of the bypass flue is connected to the smoke flue.

7. The flue gas condensation water extraction system according to claim 2, wherein the flue gas condensation end system further comprises a reagent addition device,
    wherein the reagent addition device comprises a reagent addition tank and a stirrer,
    wherein the reagent addition tank is connected to the condensate storage tank via a reagent addition pipe, and
    wherein the reagent addition pipe is provided with a dosing pump.

* * * * *